(12) United States Patent
Taneya

(10) Patent No.: US 6,283,443 B1
(45) Date of Patent: Sep. 4, 2001

(54) CHUCK AND TUBE JOINT

(75) Inventor: Yoshimoto Taneya, Koshigaya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/480,792

(22) Filed: Jan. 11, 2000

(30) Foreign Application Priority Data

Mar. 4, 1999 (JP) .................................. 11-057650

(51) Int. Cl.⁷ .................................................. F16L 37/28
(52) U.S. Cl. .................. 251/149.6; 385/316; 385/319
(58) Field of Search ............................ 251/149.6, 149.1; 285/315, 316, 319, 321, 34, 35

(56) References Cited

U.S. PATENT DOCUMENTS

| 5,248,168 | * | 9/1993 | Chichester et al. | 285/319 |
| 5,489,125 | * | 2/1996 | Hohmann | 285/319 X |
| 5,547,166 | * | 8/1996 | Engdahl | 251/149.6 |
| 5,716,081 | * | 2/1998 | Leigh-Monstevens et al. | 285/319 |

FOREIGN PATENT DOCUMENTS

| 0 331 116 | 9/1989 | (EP) . |
| 0 695 903 | 2/1996 | (EP) . |
| 1167680 | 10/1969 | (GB) . |
| 085362 | 2/1987 | (TW) . |
| 312741 | 8/1997 | (TW) . |

* cited by examiner

Primary Examiner—Kevin Lee
(74) Attorney, Agent, or Firm—Oblon, Spivak, McClelland, Maier & Neustadt, P.C.

(57) ABSTRACT

Disclosed is a tube joint comprising a first tube joint member; a second tube joint member coupled to the first tube joint member; a sleeve attached to a coupling portion between the first and second tube joint members, for coupling and releasing the first and second tube joint members; a compressive coil spring for urging the sleeve in a direction to couple the first and second tube joint members to one another; and a chuck for engaging the first and second tube joint members with each other; the chuck including, in an integrated manner, an annular ring section for inserting the first tube joint member therethrough; a first engaging section for making engagement with the first tube joint member; and a second engaging section for making elastic engagement with the second tube joint member. The tube joint includes a valve plug arranged at the inside of the first tube joint member.

18 Claims, 14 Drawing Sheets

F I G. 4
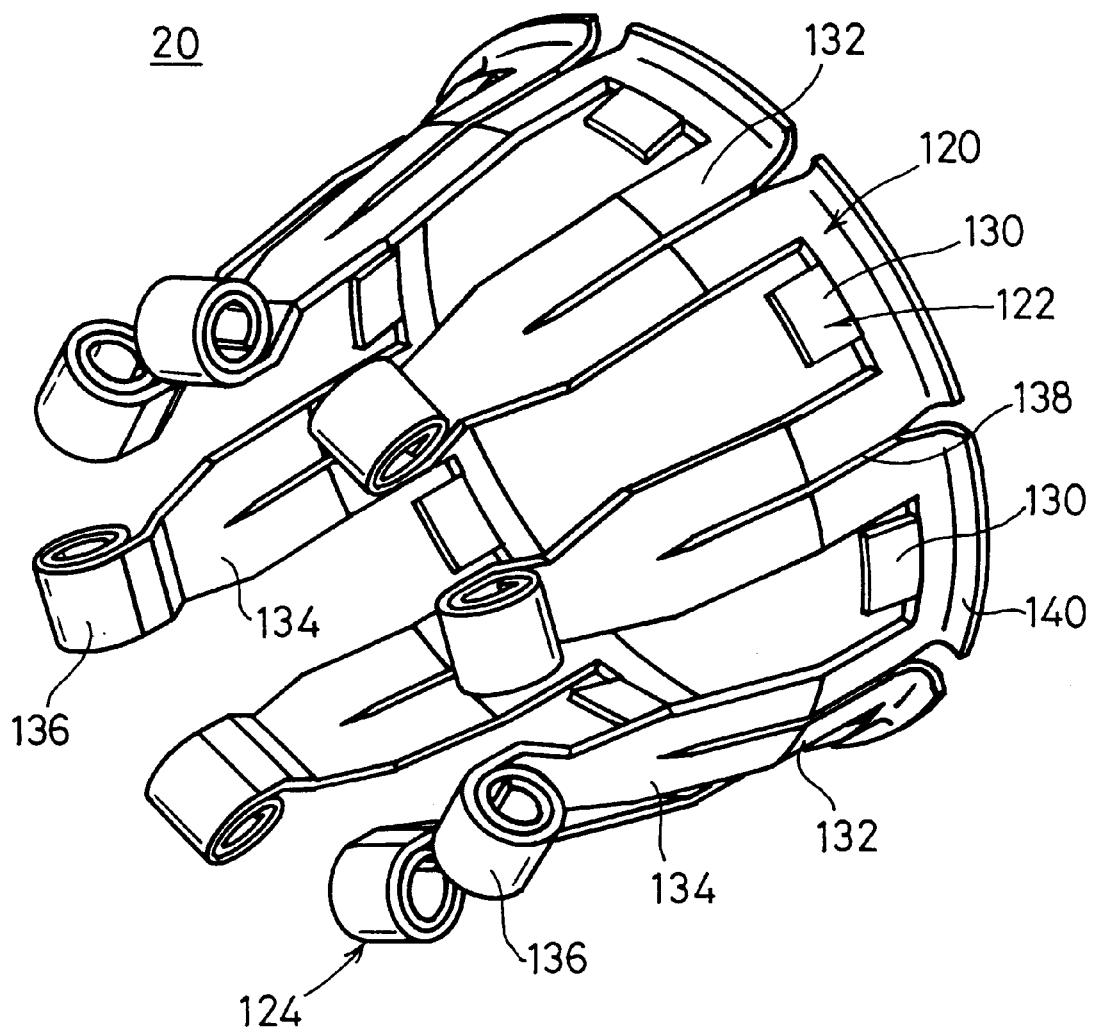

10B

US 6,283,443 B1

CHUCK AND TUBE JOINT

BACKGROUND OF THE INVENTION

1. Field of the Invention

The present invention relates to a chuck and a tube joint. In particular, the present invention relates to a tube joint and a chuck preferable to facilitate the improvement in productivity of the tube joint and the realization of a compact size and a light weight of the tube joint.

2. Description of the Related Art

In general, as shown in FIG. 15, for example, a tube joint comprises a tubular first tube joint member 300, a tubular second tube joint member 302 to be coupled to the first tube joint member 300, a sleeve 304 attached to a coupling portion between the first and second tube joint members 300, 302, for coupling and releasing the first and second tube joint members 300, 302, a compressive coil spring 306 for urging the sleeve 304 in a direction to couple the first and second tube joint members 300, 302 to one another, and a plurality of balls 308 for engaging the first and second tube joint members 300, 302 with each other.

The first tube joint member 300 includes a cylindrical member 312 which has its front portion to be inserted into the sleeve 304 and which has a female screw 310 threaded on its rear portion, and a coupling member 314 having a cylindrical configuration which is screwed into the female thread of the cylindrical member 312. An accommodating space 318 for accommodating a valve plug 316 is formed at a front portion of the coupling member 314. A closing plate 324, which is provided with a slit 322 for inserting a part of the valve plug 316, is installed between the cylindrical member 312 and the coupling member 314. A compressive coil spring 328 is inserted into the accommodating space 318, for always urging the valve plug 316 in the direction toward the closing plate 324 to close the slit 322 with a flange 326 of the valve plug 316.

The sleeve 304 is installed such that its end surface 304a is flushed with an end surface 312a of the cylindrical member 312 of the first tube joint member 300. The sleeve 304 is always urged resiliently by the compressive coil spring 306 in the direction to make separation from the first tube joint member 300 toward the second tube joint member 302. However, the sleeve 304 is suppressed so that it is not disengaged from the first tube joint member 300, by the aid of a ring-shaped stopper member 330 which is installed in the vicinity of the end surface 312a of the cylindrical member 312.

The cylindrical member 312 of the first tube joint member 300 has a plurality of holes 332 which are formed at its front end portion (portion overlapped with the second tube joint member 302), the holes 332 being formed at positions disposed at equal intervals along the circumferential direction of the cylindrical member 312. The diameter of each of the holes 332 is reduced toward the central axis of the cylindrical member 312, and the balls 308 are inserted into the holes 332 respectively. The ball 308 is arranged such that a part of the ball 308 is inserted into and engaged with an annular groove 334 formed on the surface of the second tube joint member 302, when the second tube joint member 302 is inserted into the hollow portion of the cylindrical member 312. FIG. 15 is illustrative of a case in which only two of the holes 332 and the balls 308 are shown respectively.

Usually, the balls 308 are pressed toward the central axis of the cylindrical member 312 by the aid of the sleeve 304. However, when an external force is applied to the sleeve 304 to move the sleeve 304 toward the coupling member 314 along the axial direction of the first tube joint member 300, the balls 308 are released from the pressing action of the sleeve 304. In this situation, the valve plug 316 is operated such that the flange 326 thereof abuts against the closing plate 324 to close the slit 322 by being urged by the compressive coil spring 328. Thus, the valve plug 316 is in the closed state.

Starting from this stage, when the second tube joint member 302 is inserted into the hollow portion of the cylindrical member 312 of the first tube joint member 300, the valve plug 316 is moved rearwardly against the urging force of the compressive coil spring 328 by means of the end surface of the second tube joint member 302. Thus, the valve plug 316 is in the open state.

When the external force applied to the sleeve 304 is removed, the sleeve 304 is resiliently urged in accordance with the elastic restoration of the compressive coil spring 306. Accordingly, the sleeve 304 is restored to the position at which the end surface 304a of the sleeve 304 is flushed with the end surface 312a of the cylindrical member 312.

In this state, the balls 308 are pressed by the sleeve 304 again toward the central axis of the cylindrical member 312. As a result, the balls 308 are engaged with the annular groove 334 provided on the second tube joint member 302.

The engagement of the balls 308 disables the second tube joint member 302 from being disengaged from the first tube joint member 300. Therefore, the first and second tube joint members 300, 302 are tightly joined to one another.

When the tube joint as described above is produced, an inconvenience arises in that the production cost cannot be made inexpensive, because the production steps are complicated.

The inconvenience will be specifically explained below. As described above, the conventional tube joint comprises the four balls 308, and the sleeve 304 for pressing the balls 308 toward the central axis of the tube joint. When such a tube joint is assembled, complicated operations must performed, including (1) formation of the holes 332 of the cylindrical member 312 for constructing the first tube joint member 300, (2) insertion of the balls 308 into the holes 332, and (3) installation of the sleeve 304 while pressing the balls 308 by using a jig so that the balls 308 are not disengaged from the holes 332. Further, it takes a long period of time to perform the operations.

The cylindrical member 312 and the coupling member 314 of the first tube joint member 300 are mutually different members, and it is also complicated and troublesome to connect them to one another (by means of screwing operation). Therefore, it is not easy to improve the production efficiency of the tube joint, resulting in the increase in the production cost of the tube joint.

It has been hitherto demanded for the tube joint to have a compact size and a light weight because of the following reason. That is, if the tube joint has a large size, the degree of freedom is restricted for the arrangement of the tube. Further, when the tube joint is connected with the tube, then the tube joint interferes with, for example, another tube and equipment, and it is difficult to perform the connecting operation in some cases. In the latter case, there is a likelihood that the connection between the tube and the tube joint may be incomplete, and it is feared that the sealing performance may be insufficient.

If the tube joint has a large weight, the tube connected with the tube joint may be bent due to the weight of the tube joint. In this case, it is also feared that the connection between the tube and the tube joint may be incomplete, and it is impossible to obtain any sufficient sealing performance.

In the case of the conventional tube joint as described above, it is necessary to provide a sufficiently long size of the first tube joint member 300, especially of the cylindrical member 312 along the axial direction, in order to ensure the space for inserting the balls 308. Further, the coupling member 314 is coupled by being screwed to the rear portion of the cylindrical member 312. Therefore, the length of the tube joint along the axial direction is necessarily increased, and hence the weight is also increased in accordance therewith.

Further, it is demanded to obtain a large flow rate of the fluid, for the tube joint which is provided with the valve plug 316 at its inside. In order to realize the large flow rate, it is effective to enlarge the inner diameter of the tube joint. In the case of the conventional tube joint, it is conceived to thin the wall thickness of the cylindrical member 312 of the first tube joint member 300. For this purpose, it is necessary to decrease the diameter of the balls 308. However, if the diameter of the balls 308 is decreased, the balls 308 are insufficiently engaged with the annular groove 334. As a result, it is feared that the second tube joint member 302 may be easily disengaged from the first tube joint member 300. Therefore, in the case of the conventional tube joint, it is not easy to contemplate the large flow rate as well.

SUMMARY OF THE INVENTION

The present invention has been made in order to solve the various problems described above, an object of which is to provide a chuck which makes it possible to improve the production efficiency of a tube joint, reduce the production cost, and realize a compact size, a light weight, and a large flow rate of the tube joint, for example, when the chuck is applied to the tube joint.

Another object of the present invention is to provide a tube joint which makes it possible to improve the production efficiency of the tube joint, reduce the production cost, and realize a compact size, a light weight, and a large flow rate of the tube joint.

According to the present invention, there is provided a chuck comprising an annular ring section for inserting at least one of first and second members therethrough; a first engaging section extending from the annular ring section along a central axis of the annular ring section, for making engagement with the first member; and a second engaging section extending from the annular ring section along the central axis of the annular ring section, for making elastic engagement with the second member.

In other words, the chuck includes the annular ring section which functions as a base, and it further includes the first engaging section for making engagement with the first member, and the second engaging section for making elastic engagement with the second member. These components are constructed in an integrated manner.

Accordingly, it is enough to use a small number of parts of the chuck for coupling the first member and the second member, in accordance with which it is easy to perform the coupling operation for the first and second members. Thus, it is possible to reduce the production cost of the parts including the first and second members.

Therefore, for example, when the chuck according to the present invention is applied to a tube joint, it is easy to achieve the improvement in production efficiency of the tube joint, the reduction of the production cost, and the realization of a compact size, a light weight, and a large flow rate of the tube joint.

It is also preferable for the chuck constructed as described above that the first engaging section includes a plurality of plate tabs which are provided on the annular ring section; and the second engaging section includes a plurality of plate springs which are provided on the annular ring section and which are formed to have a size longer than that of the plate tabs of the first engaging section.

It is also preferable for the chuck constructed as described above that the plate spring has an inclined section which is inclined and directed in a direction toward the central axis of the annular ring section.

It is also preferable for the chuck constructed as described above that the plate tabs of the first engaging section are provided at equal intervals on the annular ring section; and the plate springs of the second engaging section are disposed at positions different from those of the plate tabs and provided at equal intervals on the annular ring section.

It is also preferable for the chuck constructed as described above that a forward end of the plate spring is formed to have a rolled configuration, and/or a cutout is formed in the plate spring. Alternatively, the annular ring section may be provided with a flange.

According to another aspect of the present invention, there is provided a tube joint comprising a first tube joint member; a second tube joint member coupled to the first tube joint member; a sleeve member attached to a coupling portion between the first and second tube joint members, for coupling and releasing the first and second tube joint members; a resilient member for urging the sleeve member in a direction to couple the first and second tube joint members to one another; and a chuck for engaging the first and second tube joint members with each other; the chuck including, in an integrated manner, an annular ring section for inserting the first tube joint member therethrough; a first engaging section extending from the annular ring section along a central axis of the annular ring section, for making engagement with the first tube joint member; and a second engaging section extending from the annular ring section along the central axis of the annular ring section, for making elastic engagement with the second tube joint member.

Accordingly, at first, the second engaging section of the chuck is elastically engaged with the second tube joint member. Therefore, the engagement with the second tube joint member is never insufficient. Thus, it is unnecessary to use the balls having been hitherto used.

Further, the chuck has the annular ring section which functions as a base, and it further includes the first engaging section for making engagement with the first tube joint member, and the second engaging section for making elastic engagement with the second tube joint member. These components are constructed in an integrated manner.

As described above, it is unnecessary to provide any additional member for holding the balls, because it is unnecessary to use the balls. Therefore, it is possible to reduce the number of constitutive parts including the balls. As a result, the assembling steps for the tube joint are simplified, and it is possible to reduce the production cost, owing to the simplification of the assembling steps as well as the reduction of the number of parts. Further, it is unnecessary for the first tube joint member to adopt any structure to hold the additional member. Therefore, it is possible to shorten the length of the tube joint in the axial direction, and it is possible to realize a compact size and a light weight of the tube joint, owing to the shortened length as well as the reduction of the number of parts.

Further, the tube diameter of the tube joint can be increased to such an extent that the provision of the additional member is unnecessary, for example, assuming that the thickness of the tube joint is constant. Accordingly, it is possible to contemplate a large flow rate.

It is also preferable for the tube joint as described above that the first engaging section of the chuck includes a plurality of plate tabs which are provided on the annular ring section; and the second engaging section of the chuck includes a plurality of plate springs which are provided on the annular ring section and which are formed to have a size longer than that of the plate tabs of the first engaging section.

It is also preferable for the tube joint constructed as described above that the plate spring has an inclined section which is inclined and directed in a direction toward the central axis of the annular ring section.

It is also preferable for the tube joint as described above that the plate tabs of the first engaging section are provided at equal intervals on the annular ring section. In this arrangement, the chuck is fixed to the first tube joint member with an equivalent force in all directions.

It is also preferable for the tube joint as described above that the plate springs of the second engaging section are disposed at positions different from those of the plate tabs and provided at equal intervals on the annular ring section. Also in this arrangement, the chuck is fixed to the second tube joint member with an equivalent force in all directions.

It is also preferable for the tube joint as described above that a forward end of the plate spring is formed to have a rolled configuration, and/or a cutout is formed in the plate spring. Further, it is also preferable for the tube joint as described above that the annular ring section is provided with a flange, and one end of the resilient member is allowed to abut against the flange. It is also preferable that a valve plug is arranged at the inside of the first tube joint member.

It is also preferable that the tube joint as described above further comprises a lock mechanism for selectively restricting rearward displacement of the sleeve member. In this arrangement, it is also preferable that the lock mechanism includes a cylindrical holder for covering a front portion of the first tube joint member therewith; and a cylindrical lock member for making sliding movement on an outer circumference of the holder; wherein the lock member has at least two projections protruding inwardly; and the holder has a guide groove which is formed to have a shape to allow the lock member to make sliding movement while making rotation on a circumferential surface of a latter half portion of the holder in frontward and rearward directions when the lock member is rotated.

Accordingly, the sleeve member can be prevented from unexpected displacement in the rearward direction after the first tube joint member is coupled to the second tube joint member. Further, the first and second tube joint members can be tightly coupled to one another.

It is also preferable that the holder is provided, at its front end, with a guide section which is expanded outwardly so that an outer diameter is substantially the same as an inner diameter of a rear portion of the sleeve member and which makes contact with an inner wall of the sleeve member; and the guide section is allowed to extend frontwardly along the inner wall of the sleeve member. Accordingly, the sleeve member can make sliding movement in the frontward and rearward directions smoothly in a stable manner.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 shows a perspective view illustrating an arrangement of a chuck according to the embodiment of the present invention;

DESCRIPTION OF THE PREFERRED EMBODIMENTS

Explanation will be made below with reference to FIGS. 1 to 14 for illustrative embodiments of the chuck according to the present invention, and illustrative embodiments in which the chuck of the embodiment of the present invention is applied to the tube joint.

Figure 1:
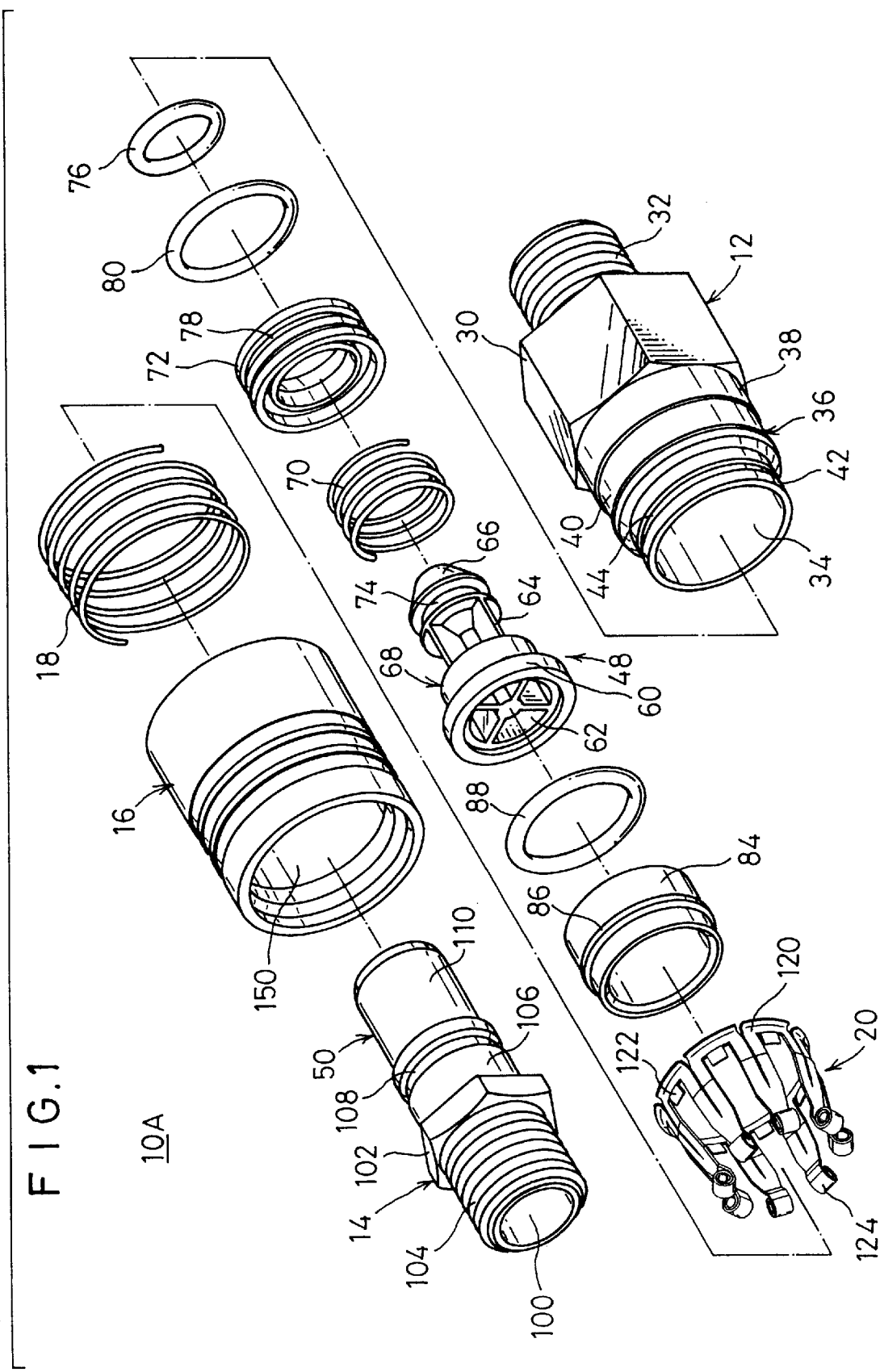
FIG. 1 shows an exploded perspective view illustrating an arrangement of a tube joint according to a first embodiment.

At first, as shown in FIG. 1, a tube joint 10A according to a first embodiment comprises a cylindrical first tube joint member 12 made of metal, a cylindrical second tube joint member 14 made of metal to be coupled to the first tube joint member 12, a sleeve 16 made of metal attached to a coupling portion between the first and second tube joint members 12, 14, for coupling and releasing the first and second tube joint members 12, 14, a compressive coil spring 18 for urging the sleeve 16 in a direction to couple the first and second tube joint members 12, 14 to one another, and a chuck 20 according to the embodiment of the present invention for coupling the first and second tube joint members 12, 14 to one another.

In the following description, explanation will be made as follows in order to specify the direction. That is, a portion of the first tube joint member 12, into which the second tube joint member 14 is inserted, is designated as a front portion. A direction, which is directed toward the second tube joint member 14 as viewed from the first tube joint member 12, is designated as a frontward direction. A portion of the second tube joint member 14, which is inserted into the first tube joint member 12, is designated as a rear portion. A direction, which is directed toward the first tube joint member 12 as viewed from the second tube joint member 14, is designated as a rearward direction.

The first tube joint member 12 has its central section 30 which is formed to have a shape of hexagonal cylinder, and it has its rear section 32 which is threaded with a male screw. Thus, the first tube joint member 12 has a structure as a bolt member having a hollow section 34, wherein an unillustrated tube is connected to the male screw section 32. The first tube joint member 12 has a first annular groove 40 which is formed along the circumferential direction at a root section 38 having a large outer diameter of a front section 36. A second annular groove 44 is formed along the circumferential direction at a small outer diameter section 42 disposed frontwardly with respect to the root section 38.

Figure 2:
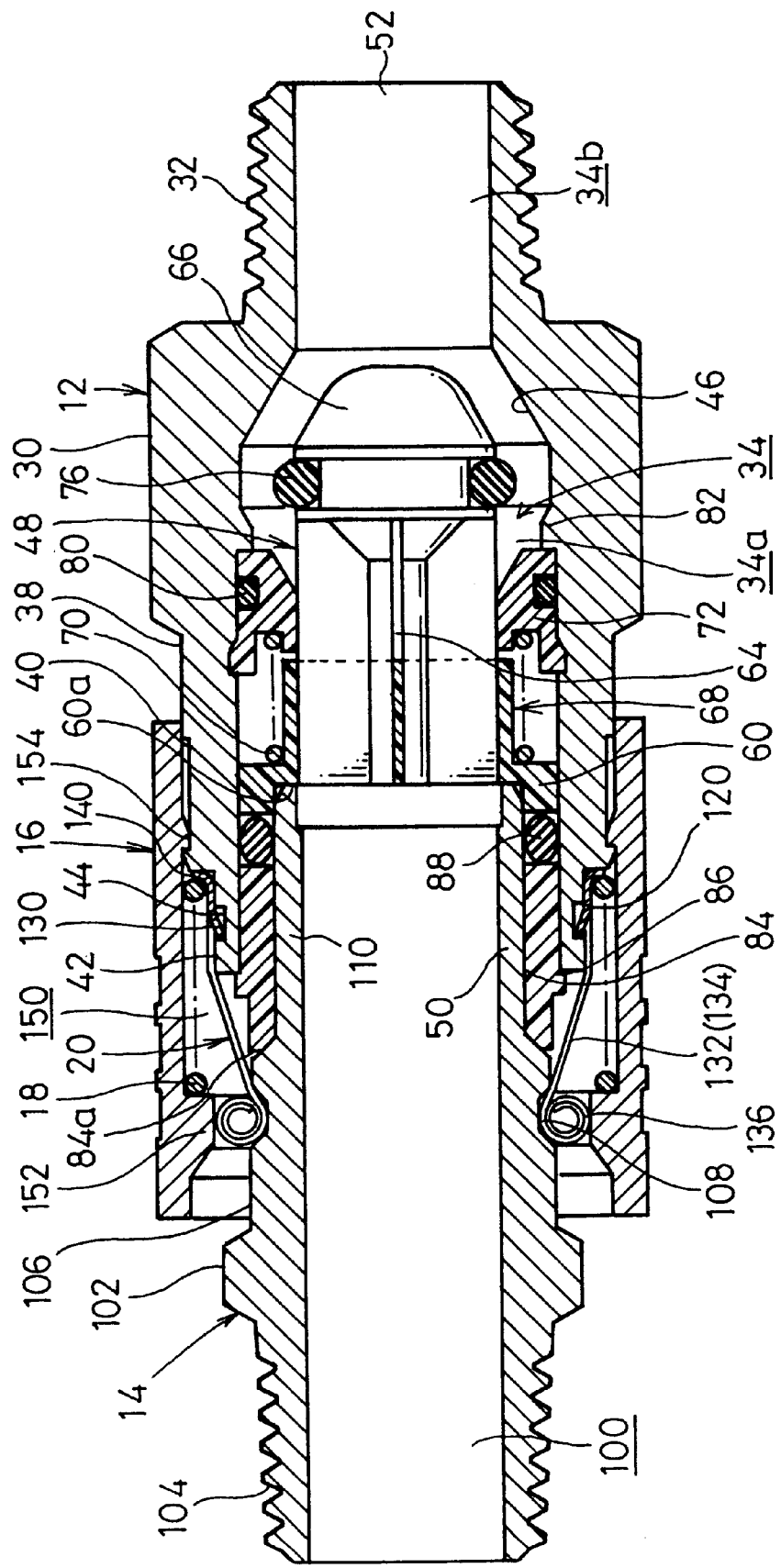
FIG. 2 shows a longitudinal sectional view illustrating the arrangement of the tube joint according to the first embodiment, especially illustrating a state in which a second tube joint member is inserted into a first tube joint member.

As shown in FIG. 2, the first tube joint member 12 is formed with the hollow section 34 which penetrates therethrough along the axial direction. A space of the hollow section 34, which is formed over a range from an opening at the front end of the hollow section 34 to a portion corresponding to a start end of the male screw section 32, is formed as an accommodating space 34a into which at least a valve plug 48 and a part of a rear section 50 of the second tube joint member 14 are inserted as described later on. A space, which is formed over a range from the start end of the male screw section 32 to an rear opening 52 of the hollow section 34, is formed as a through-hole 34b.

The diameter of the accommodating space 34a is set to be larger than the diameter of the through-hole 34b. Especially, a portion, which is disposed between the accommodating space 34a and the through-hole 34b, is formed as a tapered surface 46 with its diameter which is gradually reduced toward the through-hole 34b.

As shown in FIG. 1, the valve plug 48 includes a main valve body 68 which is integrally formed with a cylindrical base section 60, a support 64 having a crucial cross section extending rearwardly from a hollow section 62 of the base section 60, and a round projection 66 disposed at a rearward end of the support 64; and a movable member 72 which is installed to the main valve body 68 via a compressive coil spring 70. These components are made of synthetic resin. An O-ring 76 is installed to an annular groove 74 which is provided at a root portion of the projection 66 of the main valve body 68. An O-ring 80 is installed to an annular groove 78 which is provided on the movable member 72.

Figure 3:
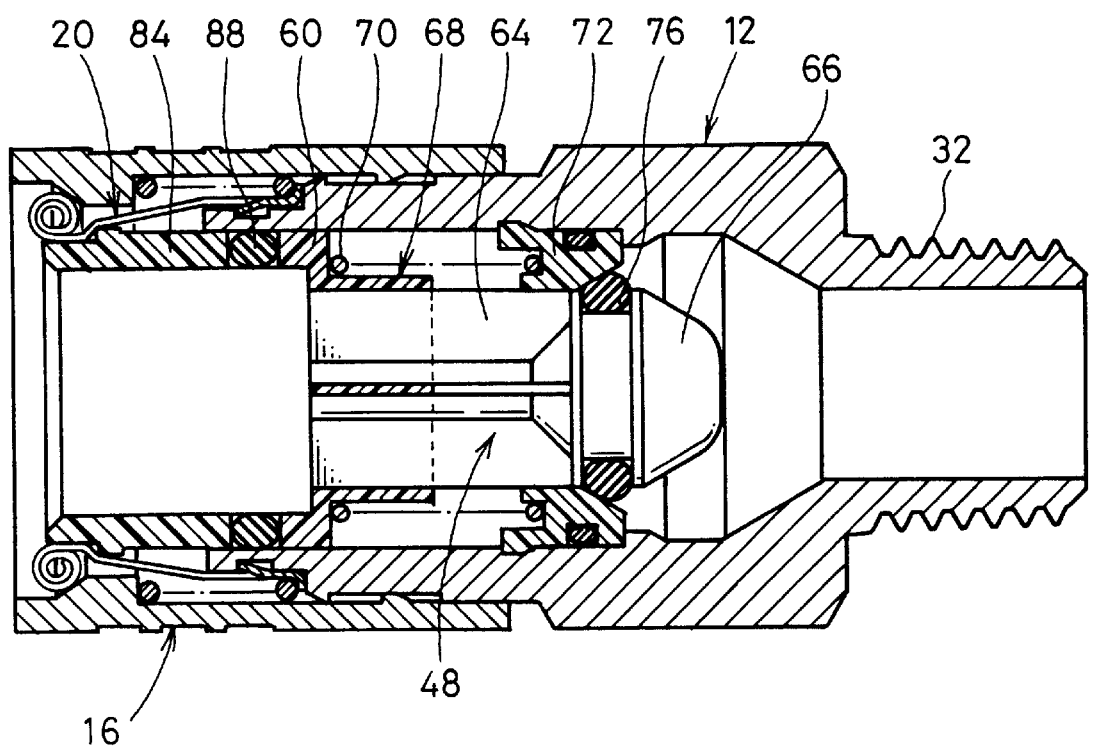
FIG. 3 shows a longitudinal sectional view illustrating the arrangement of the tube joint according to the first embodiment, especially illustrating a state in which the second tube joint member is not inserted into the first tube joint member, and a sleeve is displaced rearwardly.

Therefore, as shown in FIG. 3, the valve plug 48 is in the following situation in the natural state. That is, the root portion of the projection 66 of the main valve body 68 mutually abuts against the rear end inner wall of the movable member 72, and they are pressed to one another with the O-ring 76 interposed therebetween in accordance with the resilient urging action effected by the compressive coil spring 70. The sealing performance is ensured by the O-ring 76 between the main valve body 68 and the movable member 72. In other words, the valve plug 48 is in the closed state.

As shown in FIG. 2, when the base section 60 is moved in a direction to make relative approach to the movable member 72 against the urging action of the compressive coil spring 70, the root portion of the projection 66 is separated from the rear end inner wall of the movable member 72. Therefore, the space on the side of the projection 66 communicates with the space on the side of the base section 60. Thus, the valve plug 48 is in the open state.

The valve plug 48 constructed as described above is forcibly inserted into the accommodating space 34a of the first tube joint member 12, and it is fitted in the accommodating space 34a in a state in which the main valve body 68 is movable in the frontward and rearward directions. It is noted that the movable member 72 of the valve plug 48 is prevented from further forcible insertion (forcible insertion in the direction toward the through-hole 34b) by the aid of an annular projection 82 which is provided on an inner wall surface of the accommodating space 34a.

A cylindrical collar member 84 is attached in the accommodating space 34a along its front end inner wall. The collar member 84 has an annular projection 86 which is formed on its outer circumferential surface. The annular projection 86 functions as a stopper when the collar member 84 is forcibly inserted into the first tube joint member 12. An O-ring 88 intervenes between a rear end surface of the collar member 84 and the base section 60 of the main valve body 68. Accordingly, the sealing performance is ensured between the collar member 84 and the base section 60.

The collar member 84 has its outer diameter which is set to be approximately the same as the inner diameter of the front section 36 of the first tube joint member 12. Therefore, when the collar member 84 is forcibly inserted into the opening of the front section 36 of the first tube joint member 12, the collar member 84 can be fitted to the first tube joint member 12.

As shown in FIG. 3, the base section 60 of the main valve body 68, the collar member 84, and the O-ring 88 intervening therebetween are displaced frontwardly by being urged by the compressive coil spring 70, in the state in which the second tube joint member 14 is not inserted into the first tube joint member 12. Accordingly, the front end of the collar member 84 presses plate spring sections 132 of the chuck 20 as described later on, in a direction to make mutual outward development. In this situation, the O-ring 76, which is provided on the projection 66 of the valve plug 48, abuts against the inner wall of the movable member 74. As a result, the valve plug 48 is in the closed state.

The second tube joint member 14 has a hollow section 100 which is formed at its inside to make penetration from the front end opening to the rear end opening. The second tube joint member 14 has its central section 102 which is formed to have a shape of hexagonal cylinder, and it has its front section 104 which is threaded with a male screw. Thus, the second tube joint member 14 has a structure as a bolt member having a hollow section 100, wherein an unillustrated tube is connected to the front section (male screw section) 104. The second tube joint member 14 has an annular groove 108 which is formed along the circumferential direction at a root section 106 having a large outer diameter of a rear section 50.

A small outer diameter section 110, which is disposed at the rear section 50 of the second tube joint member 14, has its outer diameter which is set to be approximately the same as the inner diameter of the collar member 84. The length of the small outer diameter section 110 along the axial direction is set to be approximately the same as the distance from the end surface 60a of the base section 60 of the main valve body 68 to the front end surface 84a of the collar member 84.

Figure 5:
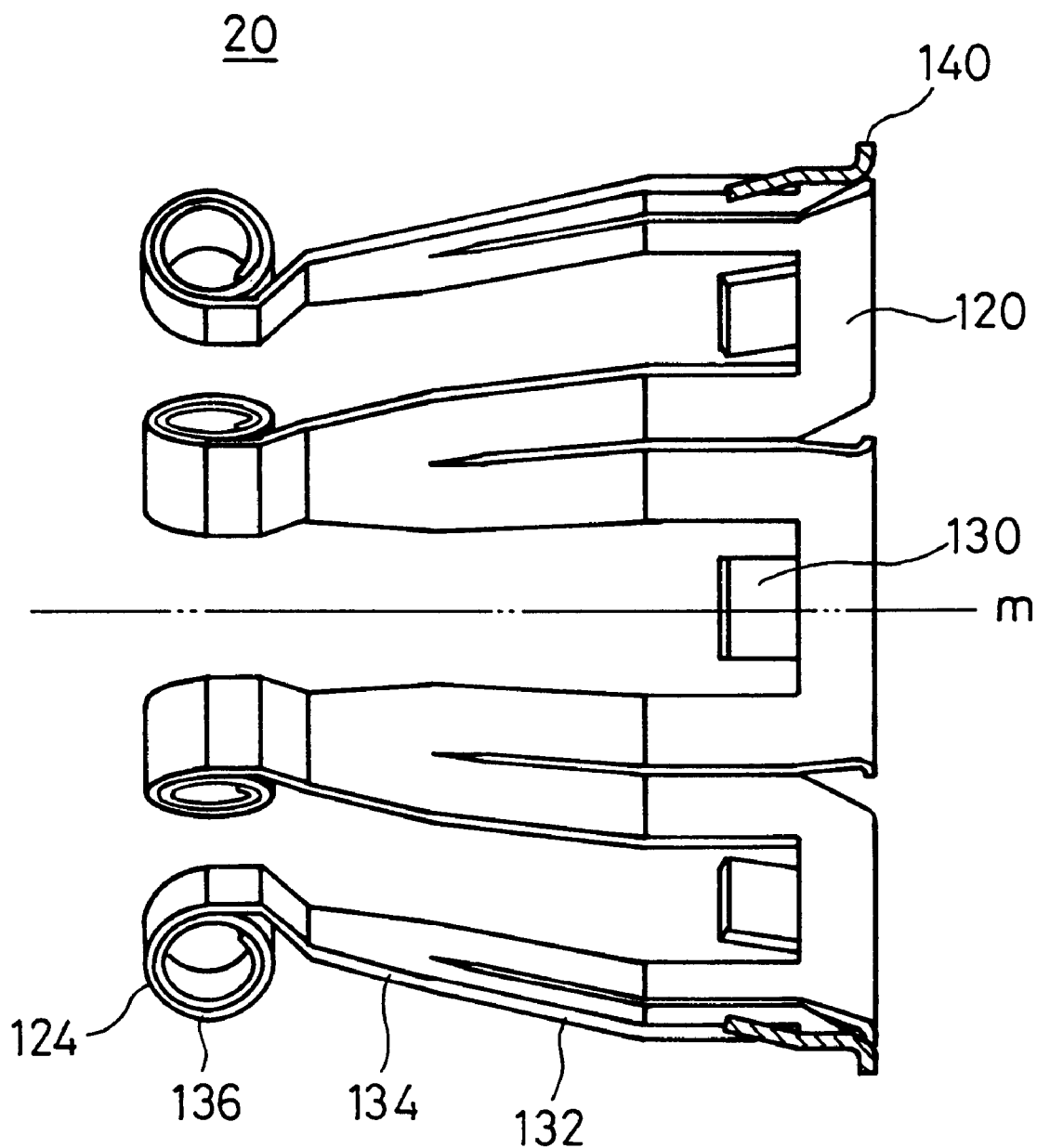
FIG. 5 shows a longitudinal sectional view illustrating the arrangement of the chuck according to the embodiment of the present invention.

As shown in FIGS. 4 and 5, the chuck 20 according to the embodiment of the present invention is made of, for example, metal. The chuck 20 comprises an annular ring section 120 for inserting the first tube joint member 12 therethrough, first engaging sections 122 extending from the annular ring section 120 along a central axis "m" of the annular ring section 120 (see FIG. 5), for making engagement with the first tube joint member 12, and second engaging sections 124 extending from the annular ring section 120 along the central axis "m" of the annular ring section 120, for elastically making engagement with the second tube joint member 14.

Specifically, the annular ring section 120 has its inner diameter which is made to be the same as the outer diameter of the small outer diameter section 42 of the front section 36 of the first tube joint member 12. The annular ring section 120 is installed to a root portion of the small outer diameter section 42.

The first engaging sections 122 are provided as a plurality of plate tabs 130 which are disposed on the annular ring section 120. The second engaging sections 124 are provided as a plurality of plate springs 132 which are disposed on the annular ring section 120 and which are formed to be longer than the plate tabs 130 of the first engaging sections 122.

The plate tabs 130 of the first engaging sections 122 are provided at equal intervals on the annular ring section 120. The plate springs 132 of the second engaging sections 124 are provided at equal intervals on the annular ring section 120 at positions different from those of the plate tabs 130. FIG. 4 is illustrative of a case in which the eight plate tabs 130 are provided at the equal intervals on the annular ring section 120 at the positions of point symmetry with respect to the center of the annular ring section 120, and the eight plate springs 132 are provided at the equal intervals at the positions of point symmetry with respect to the center of the annular ring section 120.

Each of the plate springs 132 has an inclined section 134 which is inclined and directed in the direction toward the central axis "m" of the annular ring section 120. The forward end of the inclined section 134 is a rolled section 136 formed to have a rolled configuration. The rolled section 136 is formed, for example, by winding the plate spring 132 outwardly by about 2 turns.

As shown in FIG. 2, when the second tube joint member 14 is inserted into the first tube joint member 12 in a state in which the chuck 20 is installed to the small outer diameter section 42 of the front section 36 of the first tube joint member 12, the rolled sections 136 are engaged with the annular groove 108 formed at the rear section 50 of the second tube joint member 14 in accordance with the elasticity of the plate spring 132.

In this state, the plate tabs 130 of the first engaging sections 122 are engaged with the second annular groove 44 of the front section 36 of the first tube joint member 12. Accordingly, the chuck 20 is fixed to the first tube joint member 12.

A cutout 138 is formed from the end of the annular ring section 120 toward the plate spring 132. The forward end of the cutout 138 arrives at a height of ⅔ of the height of the plate spring 132. The formation of the cutout 138 improves the flexibility of the plate spring 132, making it easy to cause the elastic deformation of the plate spring 132.

The annular ring section 120 has a flange 140 at its end. The flange 140 is formed by outwardly bending and deforming the end of the annular ring section 120. As shown in FIG. 2, the first end of the compressive coil spring 18 abuts against the flange 140. The abutment of the compressive coil spring 18 allows the chuck 20 to be more tightly fixed to the first tube joint member 12.

On the other hand, the sleeve 16 is formed to have a cylindrical configuration, and it has a hollow section 150 which penetrates therethrough from the front end opening to the rear end opening. The hollow section 150 has a diameter of such an extent that the coupling portion between the first tube joint member 12 and the second tube joint member 14 can be inserted therethrough.

An annular projection 152, which protrudes inwardly and which presses the rolled sections 136 of the chuck 20 installed to the first tube joint member 12 in the direction toward the axis of the second tube joint member 14, is integrally formed in the vicinity of the front end of the sleeve 16. An annular projection 154, which slides frontwardly and rearwardly in the first annular groove 40 disposed at the front portion of the first tube joint member 12, is integrally formed in the vicinity of the rear end of the sleeve 16. The second end of the compressive coil spring 18 abuts against the rear surface of the annular projection 152 which is provided in the vicinity of the front end of the hollow section 150.

Therefore, when the second tube joint member 14 is inserted into the first tube joint member 12, the sleeve 16 is always urged resiliently, in the natural state, by the compressive coil spring 18 in the direction to make separation from the first tube joint member 12 toward the second tube joint member 14. In this state, the annular projection 154, which is disposed in the vicinity of the rear end of the hollow section 150, abuts against the front side wall of the first annular groove 40. The rolled sections 136 of the chuck 20 are pressed toward the inside of the second tube joint member 14 by the annular projection 152 which is disposed in the vicinity of the front end of the hollow section 150.

Further, in this state, the rear end of the second tube joint member 14 rearwardly presses the base section 60 of the main valve body 68. Thus, the valve plug 48 is in the open state.

Next, a method for using the tube joint 10A according to the first embodiment will be briefly explained. At first, an external force is applied to the sleeve 16 in the state in which the second tube joint member 14 is not inserted into the first tube joint member 12, so that the sleeve 16 is displaced toward the rear portion of the first tube joint member 12. Accordingly, the rolled sections 136 are released from the pressing action of the sleeve 16. In this state, the second tube joint member 14 is inserted until its rear end surface abuts against the base section 60 of the main valve body 68. During this process, the front end surface 84a of the collar member 84 abuts against the step portion of the second tube joint member 14. In this state, the collar member 84 is at a position at which the front end of the collar member 84 presses the plate springs 132 of the chuck 20 so that they are slightly developed with each other. The valve plug 48 is still in the closed state.

Subsequently, when the second tube joint member 14 is pressed toward the first tube joint member 12, the collar member 84 and the main valve body 68 are displaced toward the rear portion of the first tube joint member 12. In this state, the rolled sections 136 of the chuck 20 arrive at the annular groove 108 formed on the second tube joint member 14. The rolled sections 136 are engaged with the annular groove 108 in accordance with the elasticity of the plate springs 132. Further, in this state, the base section 60 of the main valve body 68 is pressed toward the rear portion of the first tube joint member 12. The O-ring 76, which is provided on the projection 66 of the main valve body 68, is separated from the movable member 72, giving a state in which the O-ring 76 is positioned at an approximately central portion of the central section 30 (portion corresponding to the hexagonal cylinder) of the first tube joint member 12. Accordingly, the valve plug 48 is in the open state.

Subsequently, when the external force is removed from the sleeve 16, the sleeve 16 is displaced frontwardly in accordance with the resilient urging action of the compressive coil spring 18 until the annular projection 154 of the sleeve 16 abuts against the front side wall of the first annular groove 40 of the first tube joint member 12. The rolled sections 136 of the chuck 20 are pressed by the annular projection 152 of the sleeve 16 in the direction toward the axis of the second tube joint member 14. The pressing action allows the rolled sections 136 to be strongly engaged in the annular groove 108, and the rolled sections 136 consequently grasp the second tube joint member 14. Accordingly, the second tube joint member 14 is tightly coupled to the first tube joint member 12.

In order to disengage the second tube joint member 14 from the first tube joint member 12, an external force is applied to the sleeve 16 so that the sleeve 16 is displaced toward the rear portion of the first tube joint member 12. Thus, the rolled sections 136 of the chuck 20 are successfully released from the pressing action of the sleeve 16. During this process, the collar member 84 and the main valve body 68 are resiliently urged by the compressive coil spring 70, and the O-ring 76 provided on the projection 66 of the main valve body 68 abuts against the movable member 72 again. Accordingly, the space between the main valve body 68 and the movable member 72 is sealed, and the valve plug 48 is in the closed state.

As for the chuck 20, the plate tabs 130 are engaged with the second annular groove 44 of the first tube joint member 12. Further, the first end of the compressive coil spring 18 abuts against the flange 140 of the chuck 20. Therefore, the chuck 20 is tightly fixed to the first tube joint member 12. Accordingly, any inconvenience arises, which would be otherwise caused such that the chuck 20 is also disengaged when the second tube joint member 14 is disengaged.

As described above, the chuck 20 according to the embodiment of the present invention comprises, in an integrated manner, the annular ring section 120, the first engaging sections 122 extending from the annular ring section 120 along the central axis "m" of the annular ring section 120, and the second engaging sections 124 extending from the annular ring section 120 along the central axis "m" of the annular ring section 120. Therefore, the number of part of the chuck 20 is one. Accordingly, it is easy to perform the coupling operation which is conducted by using the chuck 20. Thus, it is possible to reduce the production cost of the parts including the chuck 20.

Therefore, for example, when the chuck 20 according to the embodiment of the present invention is applied to the tube joint 10A, it is easy to achieve the improvement of the production efficiency of the tube joint 10A, the reduction of the production cost, and the realization of a compact size, a light weight, and a large flow rate of the tube joint 10A.

The tube joint 10A according to the first embodiment comprises the chuck 20 which is used to couple the first and second tube joint members 12, 14 such that the second engaging sections 124 are elastically engaged with the second tube joint member 14. Therefore, the engagement with the second tube joint member 14 is never insufficient. It is unnecessary to use the balls which have been hitherto used.

The chuck 20 includes the annular ring section 120 as the base, and it further includes the first engaging sections 122 for making engagement with the first tube joint member 12, and the second engaging sections 124 for making elastic engagement with the second tube joint member 14. These components are constructed in an integrated manner.

As described above, it is unnecessary to use any ball. Therefore, it is unnecessary to provide any additional member for holding the balls. It is possible to reduce the number of constitutive parts including the balls. As a result, the steps for assembling the tube joint 10A are simplified, making it possible to reduce the production cost owing to the simplification of the assembling steps and the reduction of the number of parts as well.

Further, it is unnecessary for the first tube joint member 12 to adopt any structure for holding the additional member. Therefore, it is possible to shorten the length of the tube joint 10A in the axial direction. Accordingly, it is possible to realize a compact size and a light weight of the tube joint 10A owing to the shortened length as well as the reduction of the number of parts as described above.

For example, assuming that the thickness of the tube joint 10A is constant, the tube diameter of the tube joint 10A can be increased to such a degree that it is unnecessary to provide the additional member. Therefore, it is possible to contemplate a large flow rate.

Especially, in this embodiment, the chuck 20 comprises the plate springs 132 for constructing the second engaging sections 124, the plate springs 132 being disposed at the equal intervals on the annular ring section 120. Therefore, the second tube joint member 14 is grasped by the plate springs 132 by the equivalent force in all directions. The equivalent grasping action ensures the sealing performance between the collar member 84 and the second tube joint member 14.

On the other hand, the plate tabs 130 for constructing the first engaging sections 122 are also disposed at the equal intervals on the annular ring section 120. Therefore, the chuck 20 is fixed to the first tube joint member 12 by the equivalent force in all directions.

The chuck 20 is engaged with the second tube joint member 14 by the aid of the rolled sections 136 which are provided at the forward ends of the plate springs 132. Therefore, the chuck 20 is strongly engaged with the annular groove 108 formed on the second tube joint member 14, in the same manner as in the case of the use of the balls of the tube joint concerning the conventional technique. Accordingly, it is possible to avoid the inconvenience which would be otherwise caused such that the second tube joint member 14 is easily disengaged from the first tube joint member 12 during the displacement process of the sleeve 16.

The valve plug 48 and the collar member 84, which are arranged in the first tube joint member 12, are made of synthetic resin. Therefore, it is possible to further reduce the weight of the tube joint 10A.

Figure 6:
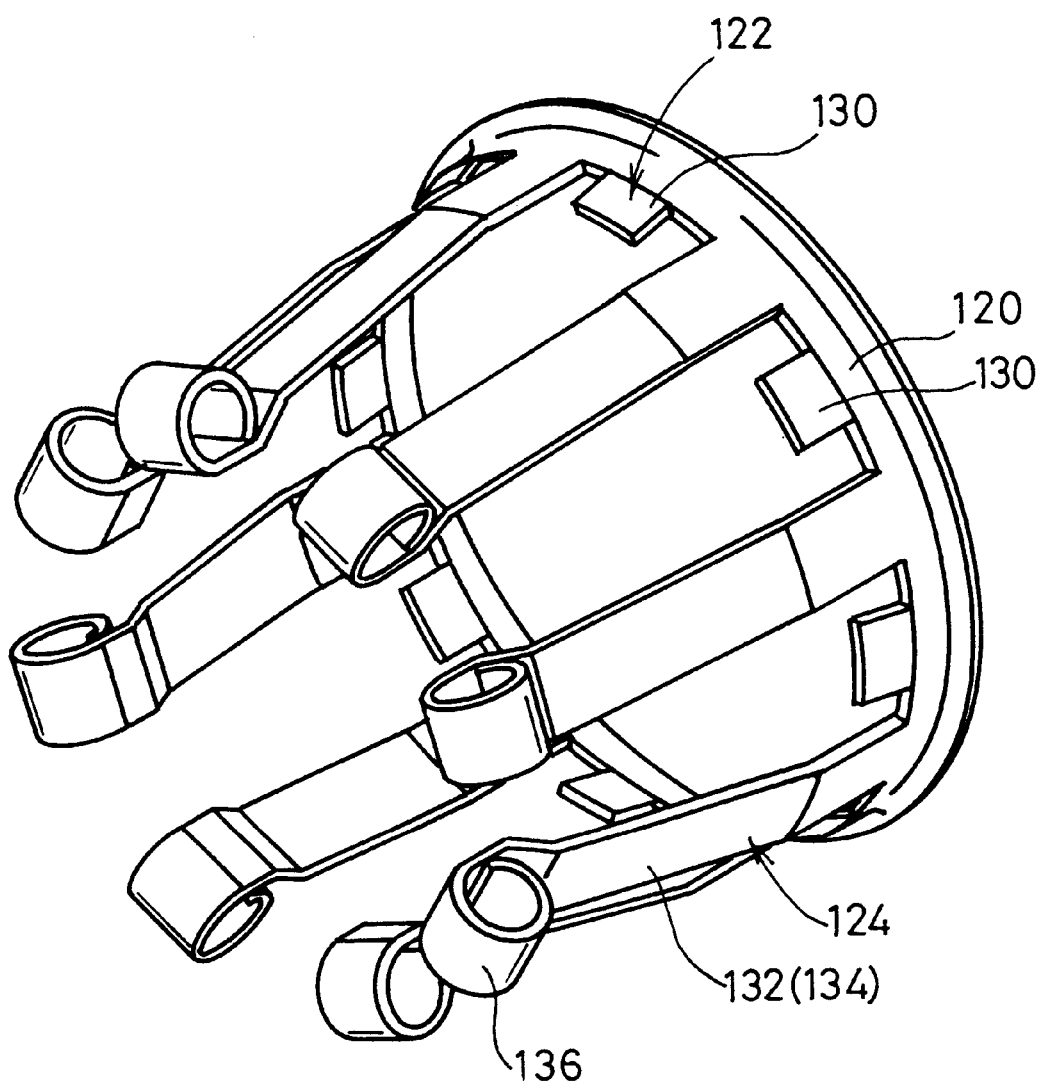
FIG. 6 shows a perspective view illustrating an arrangement of a chuck according to another embodiment.

In the chuck 20 according to the foregoing embodiment, the cutout 138 is formed from the end of the annular ring section 120 toward the plate spring 132. Alternatively, as shown in FIG. 6, the cutout 138 may not be formed.

It is optional to appropriately select whether the chuck 20 (see FIG. 1) formed with the cutouts according to the foregoing embodiment of the present invention is used, or the chuck 20 (see FIG. 6) formed with no cutout according to the another embodiment is used, depending on, for example, the size of the tube joint 10A and the type of the fluid.

Next, a tube joint 10B according to a second embodiment will be explained with reference to FIGS. 7 to 14. Components or parts corresponding to those of the tube joint 10A according to the first embodiment are designated by the same reference numerals, duplicate explanation of which will be omitted.

Figure 7:
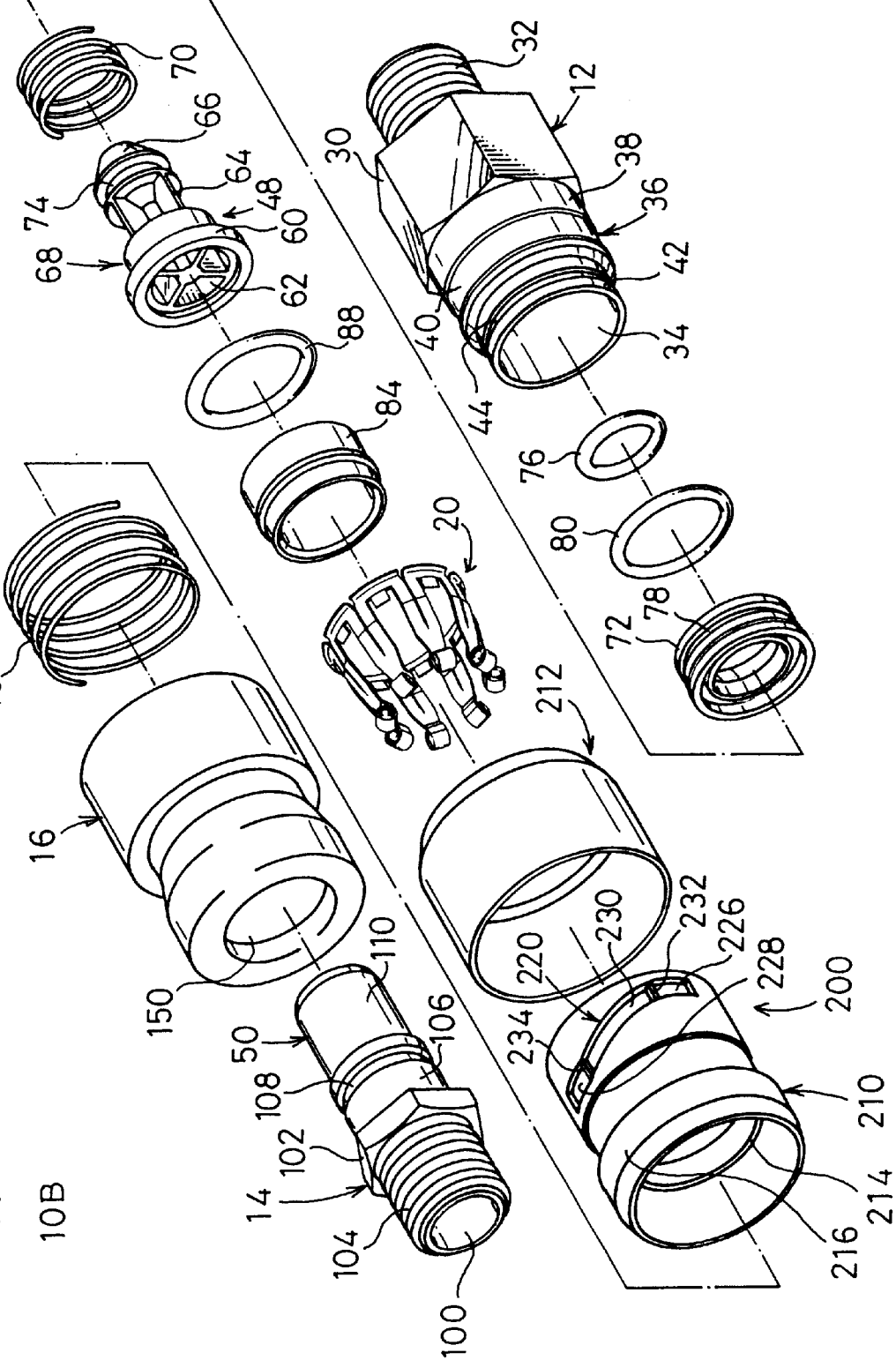
FIG. 7 shows an exploded perspective view illustrating an arrangement of a tube joint according to a second embodiment.
Figure 8:
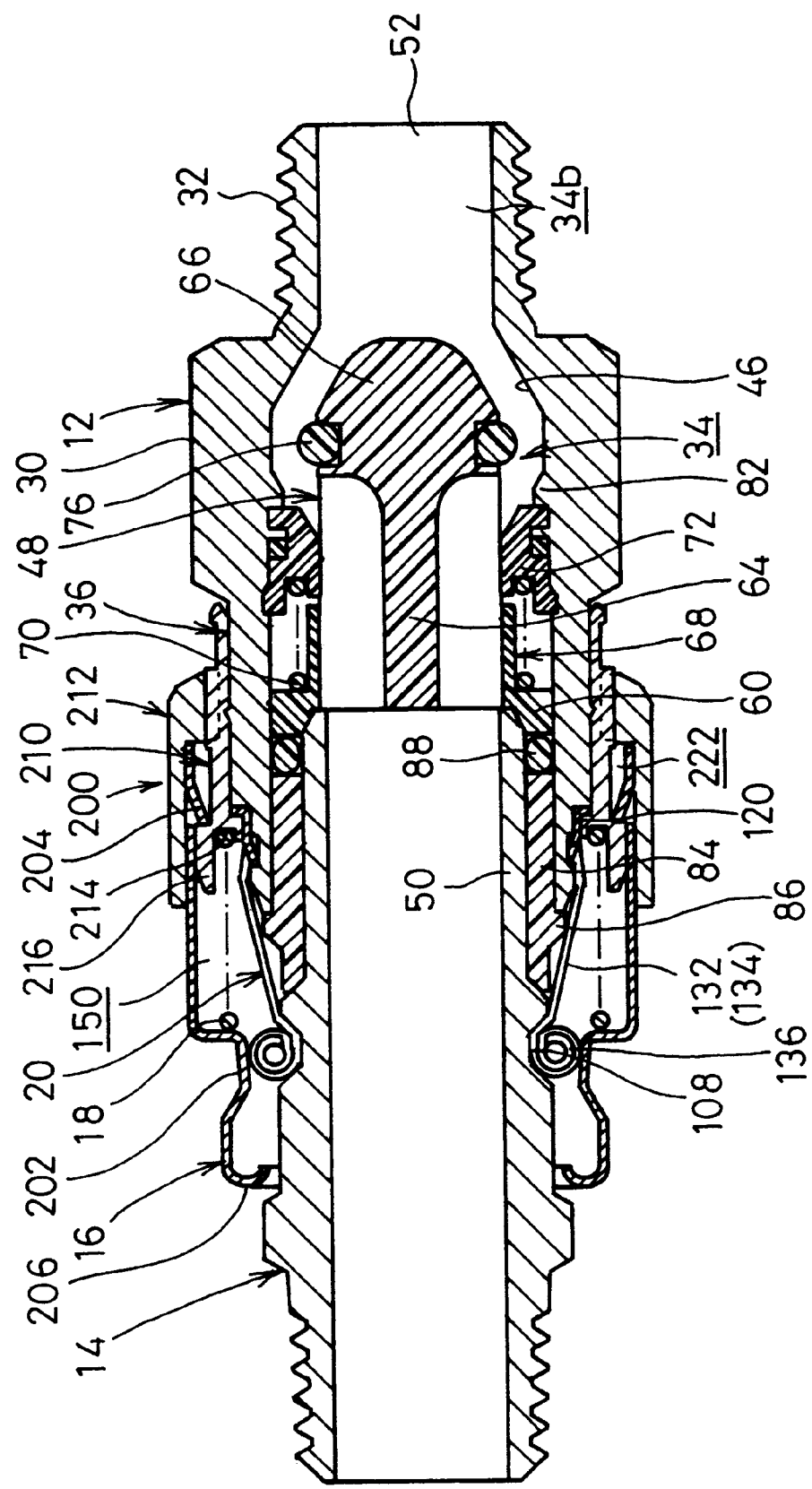
FIG. 8 shows a longitudinal sectional view illustrating the arrangement of the tube joint according to the second embodiment, especially illustrating a state in which a second tube joint member is inserted into a first tube joint member, and rearward displacement of a sleeve is restricted by a lock mechanism.

As shown in FIGS. 7 and 8, the tube joint 10B according to the second embodiment is constructed in approximately the same manner as the tube joint 10A according to the first embodiment described above (see FIGS. 1 and 2). However, the former is different from the latter in that a sleeve 16 is formed by press-forming a metal material to have a thin walled cylindrical configuration as compared with the sleeve 16 of the tube joint 10A according to the first embodiment, and that a lock mechanism 200 is provided for restricting rearward displacement of the sleeve 16.

Specifically, the sleeve 16 has a hollow section 150 which penetrate therethrough from the front end opening to the rear end opening. The hollow section 150 has a diameter of such an extent that the coupling portion between the first tube joint member 12 and the second tube joint member 14 can be inserted therethrough.

A bent section 202, which protrudes inwardly and which is used to press the rolled sections 136 of the chuck 20 installed to the first tube joint member 12 in the direction toward the axis of the second tube joint member 14, is integrally formed in the vicinity of the front end of the sleeve 16. An engaging tab 204, which is partially bent inwardly and which is engaged with a holder 210 of the lock mechanism 200 as described later on, is integrally formed in the vicinity of the rear end of the sleeve 16.

The sleeve 16 has its front end 206 which is formed by folding the material to give inward roundness, because of the following reason. That is, the convenience of handling is considered so that the second tube joint member 14 may be smoothly inserted into the hollow section 150 of the sleeve 16 (exactly into the hollow section 34 of the first tube joint member 12), and the strength of the sleeve 16 may be increased.

The lock mechanism 200 has a cylindrical holder 210 for covering the front section 36 of the first tube joint member 12 therewith, and a cylindrical lock member 212 for making sliding movement on the outer circumference of the holder 210. The holder 210 has an annular groove 214 which is formed at its front end for fitting the second end of the compressive coil spring 18 thereto.

The front end of the holder 210 is expanded outwardly so that its outer diameter is approximately the same as the inner diameter of the rear portion of the sleeve 16, and it has a guide section 216 for making contact with the inner wall of the sleeve 16. The guide section 216 is allowed to extend frontwardly along the inner wall of the sleeve 16. Accordingly, the sleeve 16 can make sliding movement in the frontward and rearward directions smoothly and stably.

Figure 9:
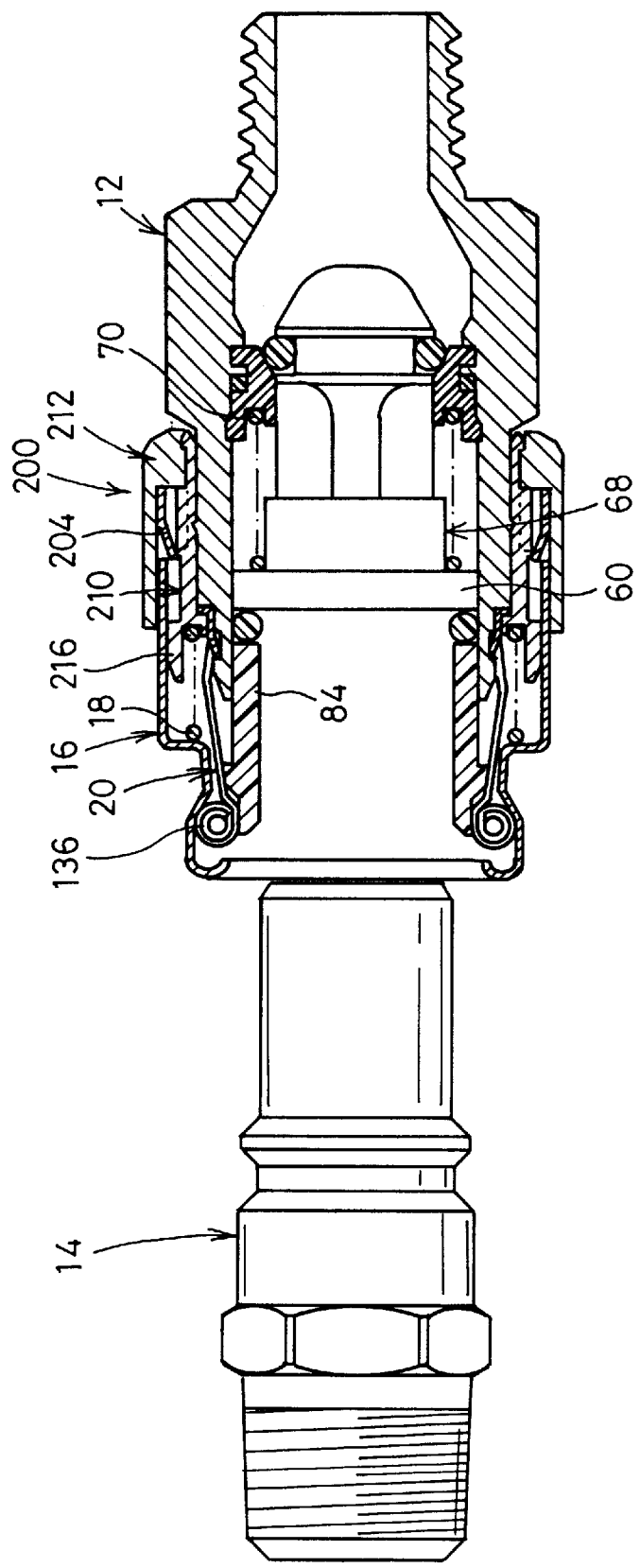
FIG. 9 shows a longitudinal sectional view illustrating the arrangement of the tube joint according to the second embodiment, especially illustrating a state in which the second tube joint member is not inserted into the first tube joint member, and the sleeve is displaced rearwardly.
Figure 10:
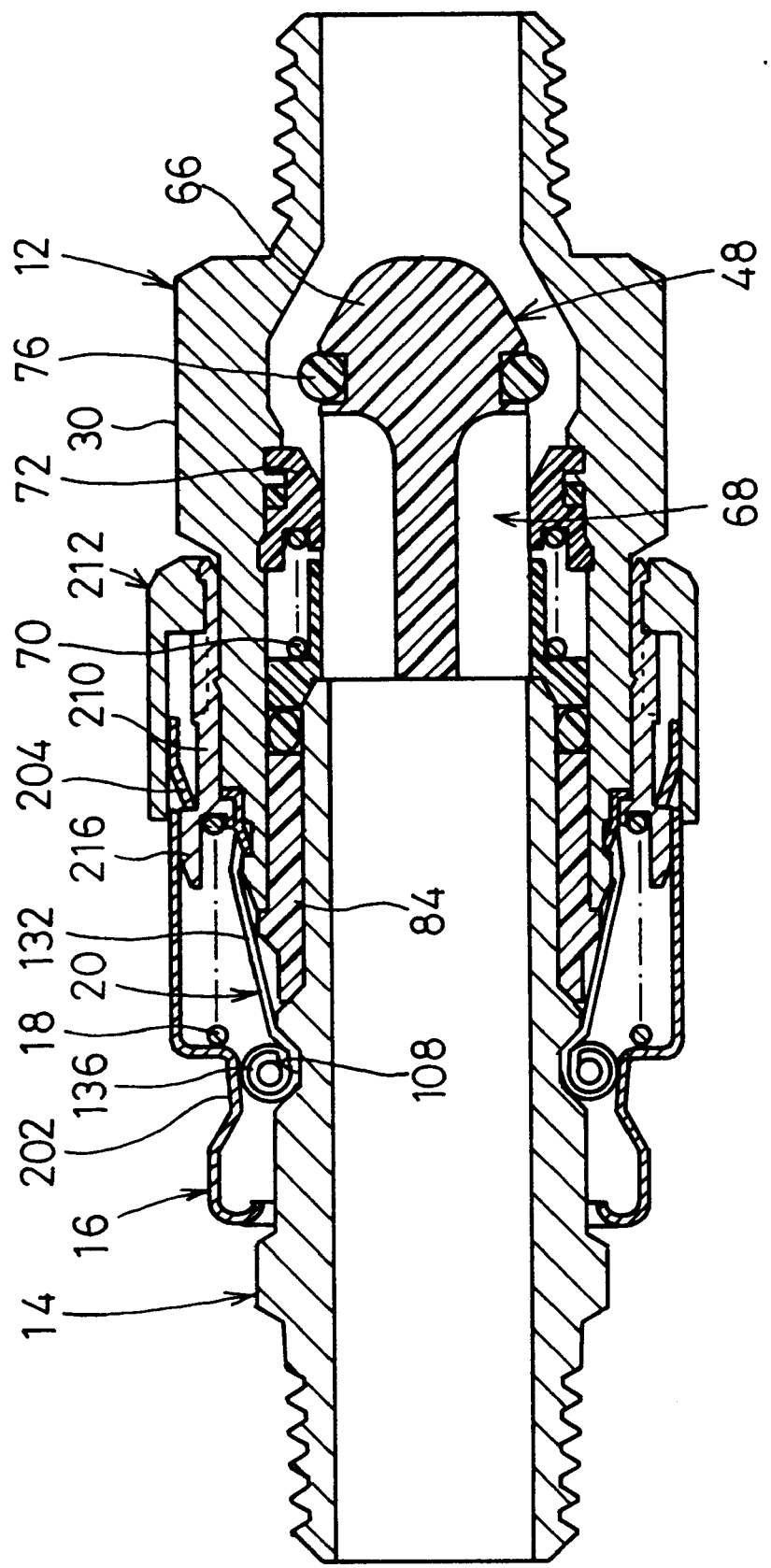
FIG. 10 shows a longitudinal sectional view illustrating the arrangement of the tube joint according to the second embodiment, especially illustrating a state in which the second tube joint member is inserted into the first tube joint member, and the lock mechanism is not operated.

FIG. 9 shows a state in which the second tube joint member 14 is not inserted into the first tube joint member 12, and the sleeve 16 is displaced rearwardly. In this state, a gap, which corresponds to an amount of relative movement of the first tube joint member 12 and the sleeve 16, is formed between the rear end surface of the guide section 216 of the holder 210 and the front end surface of the engaging tab 204 of the sleeve 16. Therefore, as shown in FIG. 10, when the second tube joint member 14 is inserted into the first tube joint member 12, then the first tube joint member 12 is moved relatively rearwardly with respect to the sleeve 16, and the front end surface of the engaging tab 204 of the sleeve 16 abuts against the rear end surface of the guide section 216 of the holder 210.

As shown in FIG. 7, the latter half portion of the holder 210 is provided with two guide grooves 220. Details of the guide grooves 220 will be described later on.

On the other hand, the lock member 212 is made of, for example, resin to have a cylindrical configuration. The lock member 212 has a hollow section 222 having a size of such a degree that the rear portion of the sleeve 16 and the holder 210 of the lock mechanism 200 can be inserted thereinto. The inner diameter of the hollow section 222 ranging from the front end to the central portion thereof is set to be a diameter of such an extent that the rear portion including the engaging tab 204 of the sleeve 16 may be covered. The inner diameter of the rear portion of the hollow section 222 is set to be smaller than the inner diameter of the hollow section 222 ranging from the front end to the central portion thereof.

Figure 11:
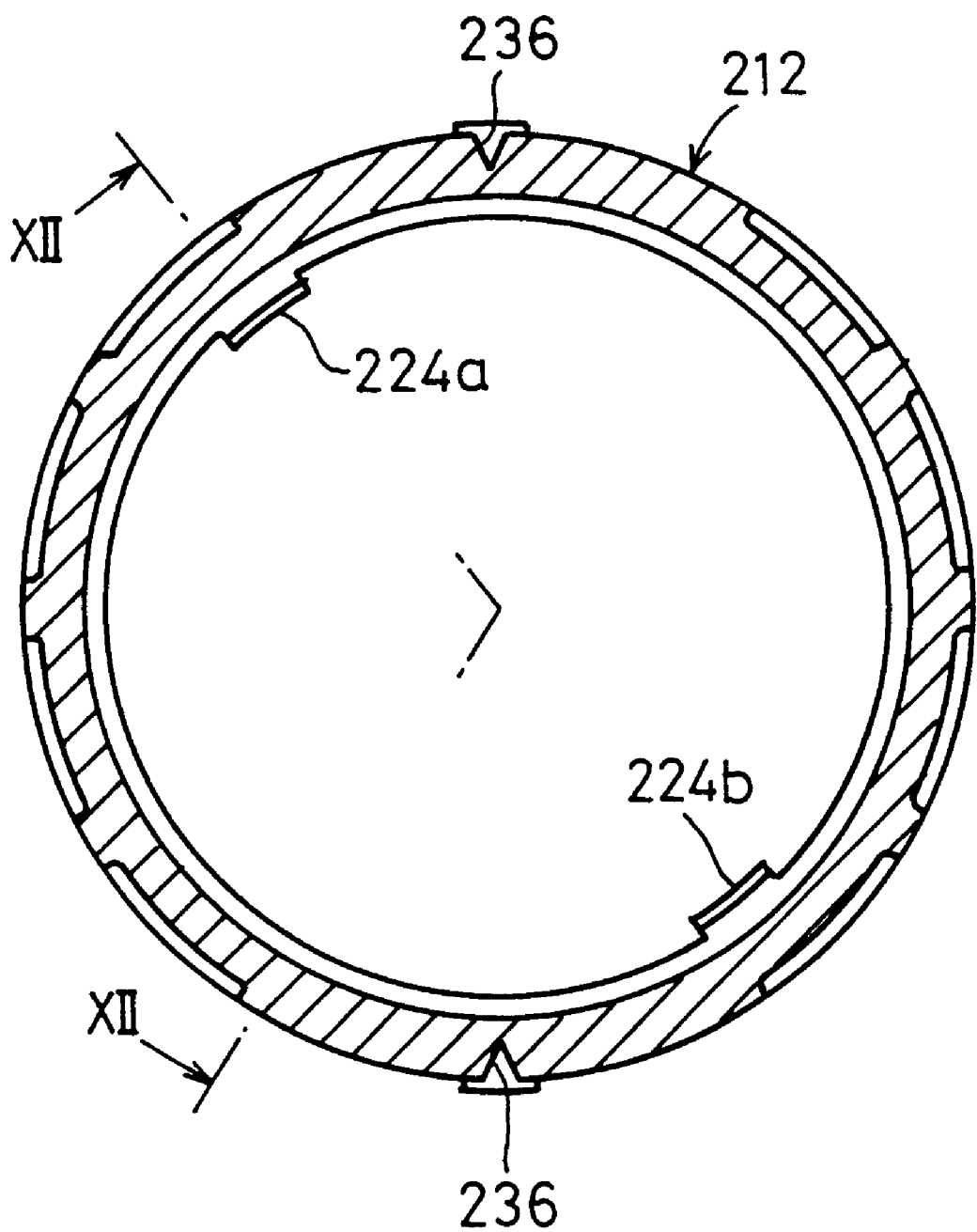
FIG. 11 shows a cross-sectional view illustrating a lock member of the lock mechanism.
Figure 12:
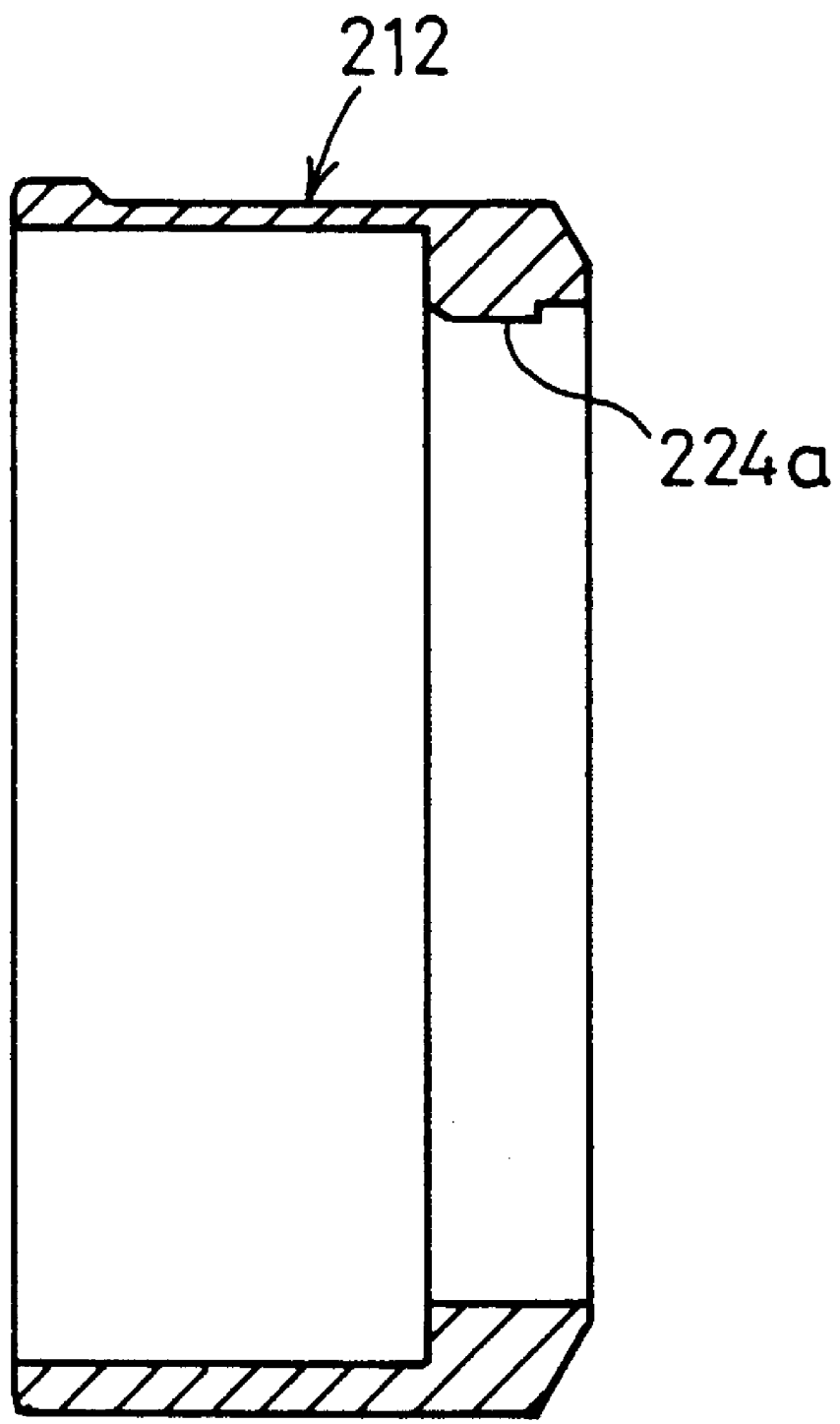
FIG. 12 shows a sectional view taken along a line XII—XII shown in FIG. 11.

Especially, as shown in FIGS. 11 and 12, two projections 224a, 224b, which protrude inwardly and which have a rectangular forward end surface, are integrally formed on the inner wall of the rear portion of the lock member 212. The two projections 224a, 224b are formed at mutually opposing positions.

The guide grooves 220, which are formed at the latter half portion of the holder 210, are formed to have such a shape that the lock member 212 rotates and slides in the frontward and rearward directions on the circumferential surface of the latter half portion of the holder 210 when the lock member 212 is rotated.

The position of the lock member 212, at which the rear end of the lock member 212 is approximately coincident with the rear end of the holder 210, is defined as the initial position. The guide groove 220 is formed in an oblique direction along the outer circumference of the latter half portion of the holder 210. When the lock member 212 is rotated in the clockwise direction in the state in which the lock member 212 is at the initial position, the lock member 212 rotates and slides toward the rear end of the sleeve 16. The sliding movement is stopped at the stage at which the lock member 212 arrives at a position (terminal end position) disposed closely to the rear end of the sleeve 16.

Figure 13:
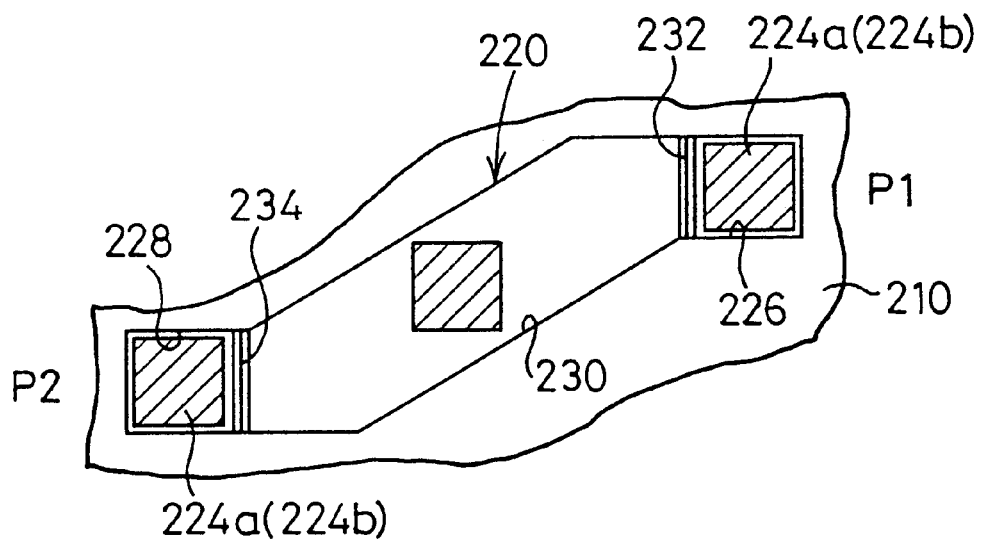
FIG. 13 illustrates the principle of operation of the lock mechanism, especially illustrating, as viewed in a plan view, the operation of projections of the lock member with respect to a guide groove formed in a holder.

Specifically, as shown in FIG. 13, the guide groove 220 includes a first groove 226 having, for example, a rectangular configuration for entering each of the projections 224a, 224b, disposed at a portion at which each of the projections 224a, 224b of the lock member 212 is located when the lock member 212 is at the initial position P1, a second groove 228 having, for example, a rectangular configuration for entering each of the projections 224a, 224b, disposed at a portion at which each of the projections 224a, 224b of the lock member 212 is located when the lock member 212 is at the terminal end position P2, and a communication groove 230 formed to extend in an oblique direction with respect to the outer circumference of the holder 210, for making communication between the first groove 226 and the second groove 228.

Figure 14:
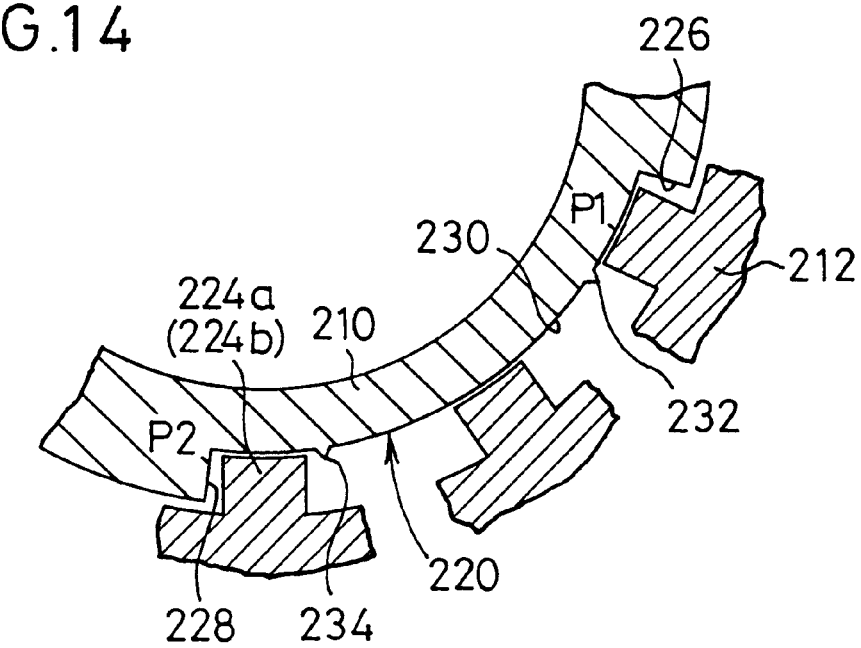
FIG. 14 illustrates the principle of operation of the lock mechanism, especially illustrating, as viewed in a side view, the operation of the projections of the lock member with respect to the guide groove formed in the holder.
Figure 15:
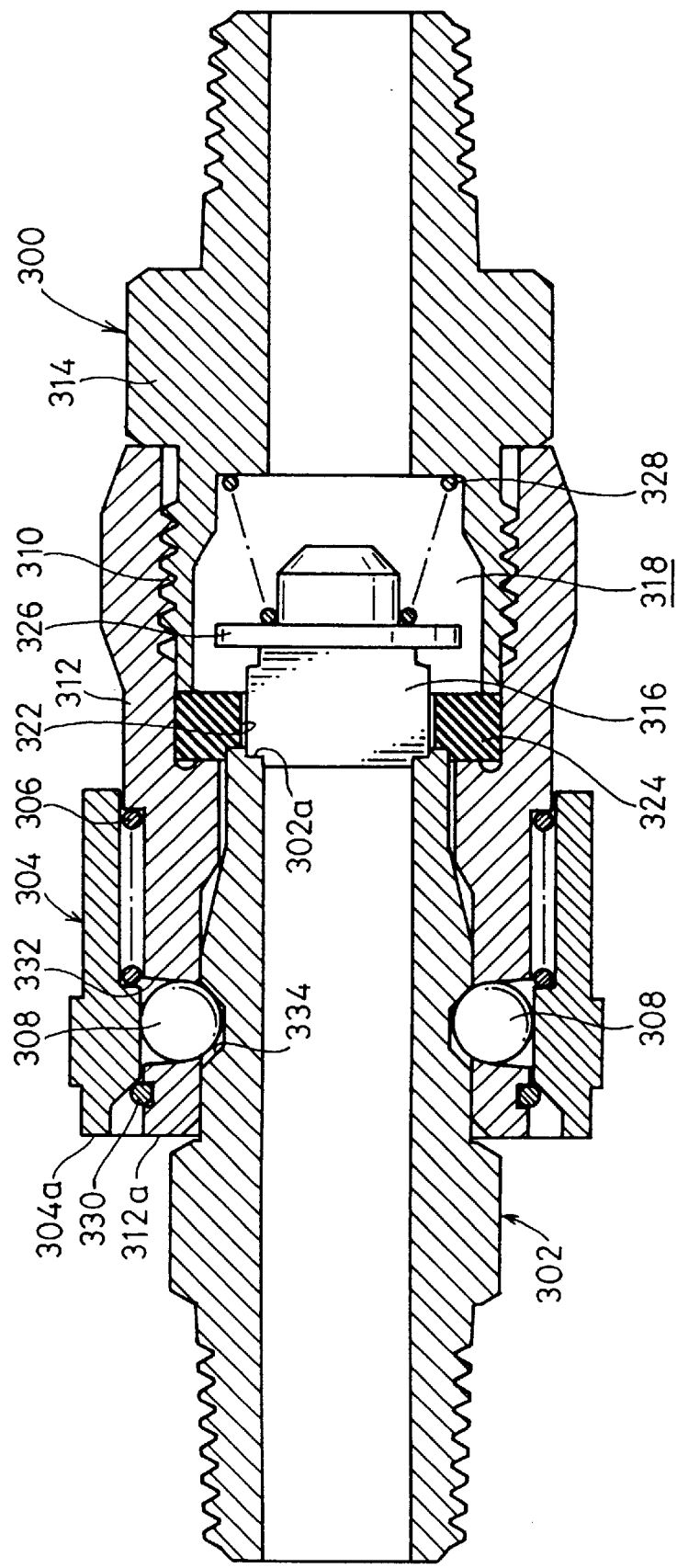
FIG. 15 shows a longitudinal sectional view illustrating an arrangement of an exemplary conventional tube joint.
Figure 15:
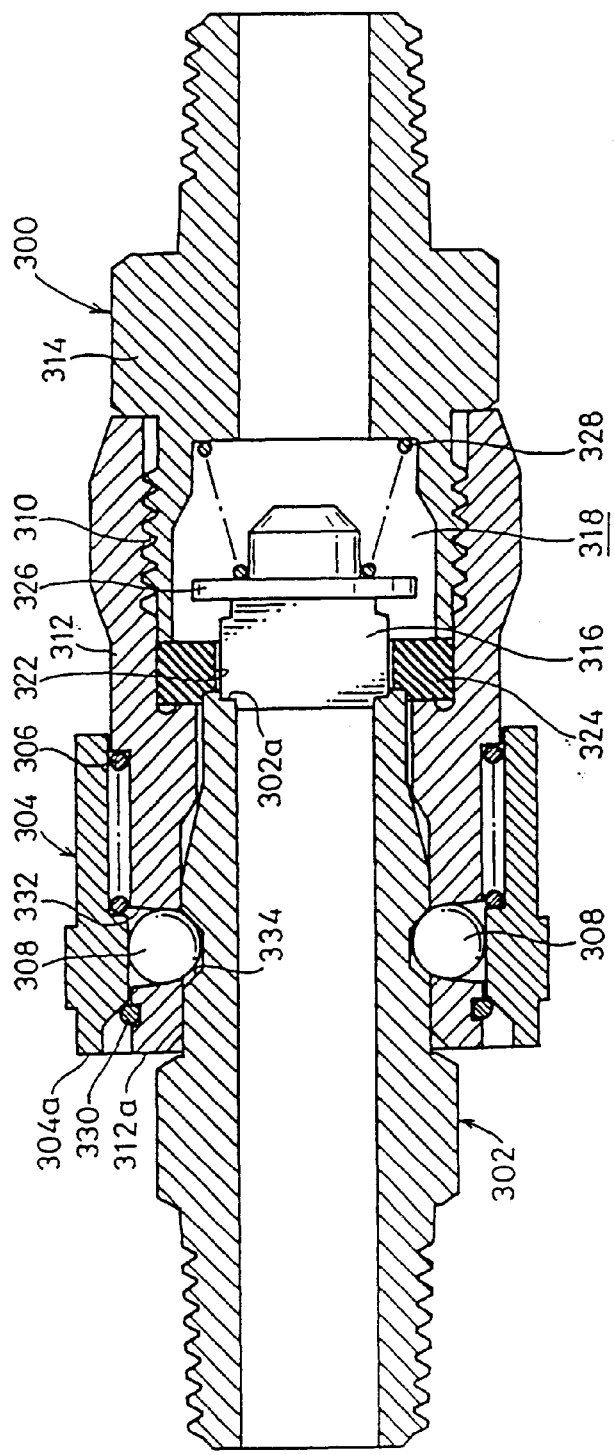

Further, as shown in FIGS. 7 and 14, first and second minute projections 232, 234 are formed at the bottom of the guide groove 220. The first minute projection 232 having a substantially triangular configuration is formed between the first groove 226 and the communication groove 230. The second minute projection 234 having a substantially triangular configuration is formed between the second groove 228 and the communication groove 230. Therefore, when the lock member 212 is located at the initial position P1 or at the terminal end position P2, the displacement is restricted by the first minute projection 232 or the second minute projection 234. When no external force is exerted, the lock member 212 is held at the initial position P1 or at the terminal end position P2.

When the lock member 212 is displaced from the initial position P1 to the terminal end position P2 or from the terminal end position P2 to the initial position P1, an external force (for example, an external force exerted by fingers of a user) is applied to the lock member 212 so that the projections 224a, 224b of the lock member 212 climb over the first and second minute projections 232, 234. The vibration during this process is transmitted to the fingers of the user. Therefore, the user can easily recognize the process (state) of the displacement of the lock member 212 from the initial position P1 to the communication groove 230, the process (state) of the displacement from the communication groove 230 to the terminal end position P2, the process (state) of the displacement of the lock member 212 from the terminal end position P2 to the communication groove 230, or the process (state) of the displacement from the communication groove 230 to the initial position P1. Thus, the operability is improved.

The lock member 212 has two V-shaped grooves 236 which are formed on the outer circumference of the lock member 212 to indicate the state (position) of rotation of the lock member 212. When the lock member 212 is located at the initial position P1, for example, each of the V-shaped grooves 236 is approximately coincident with an index (not shown) formed on the central section 30 of the first tube joint member 12 for indicating the initial position P1. When the lock member 212 is located at the terminal end position P2, for example, each of the V-shaped grooves 236 is approximately coincident with an index formed on the central section 30 of the first tube joint member 12 or the outer circumference of the holder 210 for indicating the terminal end position P2.

Next, a method for using the tube joint 10B according to the second embodiment will be briefly explained. At first, as shown in FIG. 9, an external force is applied to the sleeve 16 in the state in which the second tube joint member 14 is not inserted into the first tube joint member 12, so that the sleeve 16 is displaced toward the rear portion of the first tube joint member 12. Accordingly, the rolled sections 136 of the chuck 20 are released from the pressing action of the sleeve 16. In this situation, the lock member 212 of the lock mechanism 200 is at the initial position P1.

In this state, as shown in FIG. 10, the second tube joint member 14 is inserted until its rear end surface abuts against the base section 60 of the main valve body 68 (see FIG. 7 or 9). Further, when the second tube joint member 14 is pressed toward the first tube joint member 12, the collar member 84 and the main valve body 68 are displaced toward the rear portion of the first tube joint member 12. In this state, the rolled sections 136 of the chuck 20 arrive at the annular groove 108 formed on the second tube joint member 14. The rolled sections 136 are engaged with the annular groove 108 in accordance with the elasticity of the plate springs 132.

Further, in this state, the base section 60 of the main valve body 68 is pressed toward the rear portion of the first tube joint member 12. The O-ring 76, which is provided on the projection 66 of the main valve body 68, is separated from the movable member 72, giving a state in which the O-ring 76 is positioned at an approximately central portion of the central section 30 (portion of the hexagonal cylinder) of the first tube joint member 12. Accordingly, the valve plug 48 is in the open state.

Subsequently, when the external force is removed from the sleeve 16, the sleeve 16 is displaced frontwardly in accordance with the resilient urging action of the compressive coil spring 18 until the front end of the engaging tab 204 of the sleeve 16 abuts against the rear end of the guide section 216 of the holder 210 of the lock mechanism 200. The rolled sections 136 of the chuck 20 are pressed by the bent section 202 of the sleeve 16 in the direction toward the axis of the second tube joint member 14. The pressing action allows the rolled sections 136 to be strongly engaged in the annular groove 108, and the rolled sections 136 grasp the second tube joint member 14. Accordingly, the second tube joint member 14 is tightly coupled to the first tube joint member 12.

In this state, when the sleeve 16 is displaced frontwardly, the gap is formed between the front end surface of the rear portion of the lock member 212 and the rear end surface of the sleeve 16.

After that, the lock member 212 is rotated in the clockwise direction. Accordingly, the lock member 212 slides frontwardly along the guide groove 220 of the holder 210 (see FIG. 7). As shown in FIG. 8, at the stage at which the lock member 212 arrives at the terminal end position P2, the front end surface of the rear portion of the lock member 212 arrives at the position close to the rear end surface of the sleeve 16 or the position contacting therewith. In this state, the projections 224a, 224b of the lock member 212 climb over the second minute projections 234 respectively, and they are held at the terminal end position P2 by the aid of the second minute projections 234. Therefore, the rearward displacement of the sleeve 16 is restricted. Accordingly, the first tube joint member 12 and the second tube joint member 14 are tightly coupled to one another.

Reversely, in order to disengage the second tube joint member 14 from the first tube joint member 12, the lock member 212 is firstly rotated in the direction opposite to the clockwise direction to allow the lock member 212 to slide until it is located at the initial position P1. Accordingly, the restriction of the rearward displacement of the sleeve 16 is released.

Subsequently, an external force is applied to the sleeve 16 to displace the sleeve 16 toward the rear portion of the first tube joint member 12. Thus, the rolled sections 136 of the chuck 20 are released from the pressing action of the sleeve 16. During this process, the collar member 84 and the main valve body 68 are resiliently urged by the compressive coil spring 70, and the O-ring provided on the projection 66 of the main valve body 68 abuts against the movable member 72 again. Accordingly, the space between the main valve body 68 and the movable member 72 is sealed. Thus, the valve plug 48 is in the closed state.

As described above, the same effect as that obtained by the tube joint 10A according to the first embodiment described above can be obtained by the tube joint 10B according to the second embodiment. Additionally, the tube joint 10B can be manufactured to have a compact size and a light weight as compared with the tube joint 10B according to the first embodiment, because the sleeve 16 is composed of the thin-walled cylinder made of metal.

Further, the tube joint 10B according to the second embodiment is provided with the lock mechanism 200. Therefore, any unexpected rearward displacement of the sleeve 16 can be avoided after the first tube joint member 12 and the second tube joint member 14 are coupled to one another. Further, the tube joint members 12, 14 can be tightly coupled to one another.

It is a matter of course that the chuck and the tube joint according to the present invention are not limited to the embodiments described above, which may be embodied in other various forms without deviating from the gist or essential characteristic of the present invention.

As explained above, according to the chuck concerning the present invention, it is possible to easily achieve the improvement in the production efficiency of the tube joint, the reduction of the production cost, and the realization of the compact size, the light weight, and the large flow rate of the tube joint, for example, when the chuck is applied to the tube joint.

Further, according to the tube joint concerning the present invention, it is possible to easily achieve the improvement in the production efficiency of the tube joint, the reduction of the production cost, and the realization of the compact size, the light weight, and the large flow rate of the tube joint.

What is claimed is:

1. A chuck comprising:
    an annular ring section for inserting at least one of first and second members therethrough;
    a first engaging section extending from said annular ring section along a central axis (m) of said annular ring section, for making engagement with said first member, said first engaging section including a plurality of plate tabs which are provided on said annular ring section and inclined with respect to said annular ring section, for making engagement in a receiving part of said first member; and
    a second engaging section extending from said annular ring section along said central axis (m) of said annular ring section, said second engaging section including a plurality of plate springs which are provided on said annular ring section at positions different from those of said plate tabs and being and inclined with respect to said annular ring section, for making elastic engagement with said second member.

2. The chuck according to claim 1, wherein said plate springs are formed to have a size longer than that of said plate tabs of said first engaging section.

3. The chuck according to claim 2, wherein said plate spring has an inclined section which is inclined and directed in a direction toward said central axis of said annular ring section.

4. The chuck according to claim 2, wherein:
    said plate tabs of said first engaging section are provided at equal intervals on said annular ring section; and
    said plate springs of said second engaging section are disposed at positions different from those of said plate tabs and provided at equal intervals on said annular ring section.

5. The chuck according to claim 2, wherein a forward end of said plate spring is formed to have a rolled configuration.

6. The chuck according to claim 2, wherein a cutout is formed in said plate spring.

7. The chuck according to claim 1, wherein said annular ring section is provided with a flange.

8. A tube joint comprising:
    a first tube joint member;
    a second tube joint member coupled to said first tube joint member;
    a sleeve member attached to a coupling portion between said first and second tube joint members, for coupling and releasing said first and second tube joint members;
    a resilient member for urging said sleeve member in a direction to couple said first and second tube joint members to one another; and
    a chuck for engaging said first and second tube joint members with each other, said chuck including:
        an annular ring section for inserting said first tube joint member therethrough;
        a first engaging section extending from said annular ring section along a central axis (m) of said annular ring section, for making engagement with said first tube joining member, said first engaging section including a plurality of plate tabs which are provided on said annular ring section and inclined with respect to said annular ring section, for making engagement in a receiving part of said first tube joint member; and
        a second engaging section extending from said annular ring section along said central axis (m) of said annular ring section, said second engaging section including a plurality of plate springs which are provided on said annular ring section at positions different from those of said plate tabs and being inclined with respect to said annular ring section, for making elastic engagement with said second tube joint member.

9. The chuck according to claim 8, wherein said plate springs are formed to have a size longer than that of said plate tabs of said first engaging section.

10. The tube joint according to claim 9, wherein said plate spring has an inclined section which is inclined and directed in a direction toward said central axis of said annular ring section.

11. The tube joint according to claim 9, wherein:
    said plate tabs of said first engaging section are provided at equal intervals on said annular ring section; and
    said plate springs of said second engaging section are disposed at positions different from those of said plate tabs and provided at equal intervals on said annular ring section.

12. The tube joint according to claim 9, wherein a forward end of said plate spring is formed to have a rolled configuration.

13. The tube joint according to claim 9, wherein a cutout is formed in said plate spring.

14. The tube joint according to claim 9, wherein said annular ring section is provided with a flange, and one end of said resilient member is allowed to abut against said flange.

15. The tube joint according to claim 9, wherein a valve plug is arranged at the inside of said first tube joint member.

16. A tube joint comprising:
    a first tube joint member;
    a second tube joint member coupled to said first tube joint member;
    a sleeve member attached to a coupling portion between said first and second tube joint members, for coupling and releasing said first and second tube joint members;
    a resilient member for urging said sleeve member in a direction to couple said first and second tube joint members to one another; and a chuck for engaging said first and second tube joint members with each other, said chuck including:

an annular ring section for inserting said first tube joint member therethrough;

a first engaging section extending from said annular ring section along a central axis (m) of said annular ring section, for making engagement with said first tube joining member;

a second engaging section extending from said annular ring section along said central axis (m) of said annular ring section, for making elastic engagement with said second tube joint member; and a lock mechanism for selectively restricting rearward displacement of said sleeve member.

17. The tube joint according to claim 16, wherein said lock mechanism includes:

a cylindrical holder for covering a front portion of said first tube joint member therewith; and a cylindrical lock member for making sliding movement on an outer circumference of said holder, and wherein:

said lock member has at least two projections protruding inwardly; and said holder has a guide groove which is formed to have a shape to allow said lock member to make sliding movement while making rotation on a circumferential surface of a latter half portion of said holder in frontward and rearward directions when said lock member is rotated.

18. The tube joint according to claim 17, wherein:

said holder is provided, at its front end, with a guide section which is expanded outwardly so that an outer diameter is substantially the same as an inner diameter of a rear portion of said sleeve member and which makes contact with an inner wall of said sleeve member; and said guide section is allowed to extend frontwardly along said inner wall of said sleeve member.

\* \* \* \* \*

UNITED STATES PATENT AND TRADEMARK OFFICE
CERTIFICATE OF CORRECTION

PATENT NO.    : 6,283,443 B1
DATED         : September 4, 2001
INVENTOR(S)   : Taneya It is certified that error appears in the above-identified patent and that said Letters Patent is hereby corrected as shown below:

<u>Title page,</u>
Item [30], Foreign Application Priority Data, should read:
-- [30]        Foreign Application Priority Data

Mar. 4, 1999   (JP) ................................. 11-057650
      Sep. 22, 1999  (JP) ................................. 11-268716 --

<u>Drawings,</u>
Sheet 14 of 14 should be replaced with the attached Sheet 14.

Signed and Sealed this

Thirteenth Day of May, 2003

JAMES E. ROGAN
*Director of the United States Patent and Trademark Office*